US012590576B1

(12) United States Patent
Cao

(10) Patent No.: US 12,590,576 B1
(45) Date of Patent: Mar. 31, 2026

(54) INTEGRATED SOLAR FOUNTAIN, AND MANUFACTURING AND ASSEMBLY METHOD THEREFOR

(71) Applicant: Jingjing Cao, Changde (CN)

(72) Inventor: Jingjing Cao, Changde (CN)

( * ) Notice: Subject to any disclaimer, the term of this patent is extended or adjusted under 35 U.S.C. 154(b) by 0 days.

(21) Appl. No.: 19/302,731

(22) Filed: Aug. 18, 2025

(51) Int. Cl.
*F04B 17/00* (2006.01)
*B05B 17/08* (2006.01)

(52) U.S. Cl.
CPC ............ *F04B 17/006* (2013.01); *B05B 17/08* (2013.01)

(58) Field of Classification Search
CPC ......... B05B 12/02; B05B 12/04; B05B 12/06; B05B 9/0416; B05B 17/08; B05B 17/085; B05B 9/043; B05B 9/03; B05B 1/14; B05B 14/00; F04B 17/006; F04D 13/068
See application file for complete search history.

(56) References Cited

U.S. PATENT DOCUMENTS 7,530,330 B1 * 5/2009 Valle .................... A01K 45/002 119/51.5
2006/0032936 A1 * 2/2006 Proch .................... B05B 17/085 239/69
2019/0091716 A1 * 3/2019 Fuller .................... B63B 35/00
2024/0133369 A1 * 4/2024 Bologeorges ........... F04B 49/06

FOREIGN PATENT DOCUMENTS

CN 206296114 U 7/2017
CN 206688955 U 12/2017
CN 215278191 U 12/2021
CN 221934372 * 11/2024 ............ B05B 17/08

* cited by examiner

*Primary Examiner* — Christopher R Dandridge
(74) *Attorney, Agent, or Firm* — Nitin Kaushik

(57) ABSTRACT

Disclosed are an integrated solar fountain and a manufacturing and assembly method therefor, which belong to the technical field of fountain devices. The fountain includes an integrated injection-molded housing, which integrates a placement cavity, a rotor cavity, and a flow channel. A PCB and a wound stator core are mounted in the placement cavity in a sealing manner. A rotor in the rotor cavity is connected to blades in a pump casing. The flow channel is in communication with the pump casing and a water outlet. A float ring is provided beneath the housing, and a filter screen is provided beneath the pump casing. The manufacturing and assembly method includes steps of housing pre-treatment, installation of the wound stator core, the PCB, and an assembly of the rotor and the blades, sealing of the placement cavity, installation of the solar panel, application of a protective adhesive layer.

9 Claims, 8 Drawing Sheets

INTEGRATED SOLAR FOUNTAIN, AND MANUFACTURING AND ASSEMBLY METHOD THEREFOR

TECHNICAL FIELD

The present disclosure relates to the technical field of fountain devices, and in particular, to an integrated solar fountain and a manufacturing and assembly method therefor.

BACKGROUND

Solar fountains utilizes solar energy to drive water pumps to create waterscapes and are widely used. Most existing products adopt a split-type structure, where solar panels, controllers (PCBs), water pumps (including motors and pump bodies) and floats are independently manufactured and then assembled. This design has shortcomings, such as poor waterproofness, complex and inefficient assembly, insufficient operational stability, limited water flow efficiency and the like. Therefore, there is an urgent need for a highly integrated design and manufacturing method to fundamentally address the waterproofness, assembly efficiency and stability challenges of split-type solar fountains.

SUMMARY

An objective of the present disclosure is to provide an integrated solar fountain and a manufacturing and assembly method therefor, so as to solve the problems of poor waterproofness, complex assembly and insufficient stability of existing split-type solar fountains.

To achieve the above objective, the present disclosure adopts the following technical solutions:

An integrated solar fountain includes a housing, a solar panel, a PCB, a wound stator core, a rotor, and blades, wherein the housing is an integrated injection-molded structure, which integrates a placement cavity, a rotor cavity, and a flow channel; the solar panel is fixed to the upper surface of the housing; the PCB and the wound stator core are mounted in the placement cavity in a sealing manner, and the wound stator core surrounds the rotor cavity; the rotor cavity is provided with a rotary shaft, and the rotor is mounted to the rotary shaft; the bottom of the placement cavity is connected to a pump casing, and the blades are fixed to the rotor and located inside the pump casing; the lower end of the flow channel is in communication with the pump casing, and the upper end of the flow channel extends to the top of the housing to form a water outlet. This technical solution integrates the placement cavity, the rotor cavity, and the flow channel by means of an integrated injection-molded housing, thereby combining core components such as the solar panel, the PCB, the wound stator core, the rotor, and the blades into a single integrated unit.

Furthermore, the housing is circular in shape, and the placement cavity is located at a lower portion of the housing and protrudes downward; and a float ring is provided beneath the housing and outside the placement cavity.

Furthermore, the top of the placement cavity is sealed by a cover plate, and a connection between the cover plate and the placement cavity is filled with a waterproof adhesive. The cover plate on the top of the placement cavity forms a first sealing barrier by means of physical blocking, and the waterproof adhesive filling gaps at the connection between the cover plate and the placement cavity forms a second sealing barrier, doubly blocking the path of moisture entering the placement cavity from the top thereof.

Furthermore, the surface of the solar panel is covered with a transparent protective adhesive layer, which simultaneously achieves the dual functions of protecting the solar panel and sealing internal components.

Furthermore, the PCB is integrated with a Hall element and an energy storage capacitor. The energy storage capacitor is a supercapacitor or a rechargeable battery, and the energy storage capacitor is electrically connected to the solar panel and the wound stator core by means of wires. The Hall element on the PCB is capable of detecting the position of the rotor in real time and accurately controlling the current direction of the wound stator core to ensure stable rotation of the rotor.

Furthermore, a water inlet of the pump casing is located directly above the filter screen, and a water outlet of the pump casing is in communication with the lower end of the flow channel through an inclined side water channel, and an angle between the side water channel and the flow channel ranges from 300 to 60°.

Furthermore, the rotor cavity is located in a central area of the placement cavity, and the rotor cavity and the placement cavity are coaxially arranged. A wear-resistant bearing is provided between the rotary shaft and the inner wall of the rotor cavity, and the rotor is rotatably connected to the rotary shaft by means of the bearing.

Furthermore, the filter screen is provided beneath the pump casing and is detachably snap-fitted with the pump casing. The filter screen has a mesh size ranging from 0.5 mm to 2 mm, which helps prevent wear and tear on the blades and the rotary shaft caused by impurities, avoids blockage of the flow channel, and reduces the frequency of device downtime for maintenance. This also mitigates performance degradation due to impurities, ensuring long-term stable operation of a water pump.

The present disclosure further discloses a method for manufacturing and assembling an integrated solar fountain, the method including following steps:

step one: housing pre-treatment: deburring the integrated injection-molded housing, and polishing the interior of the flow channel to ensure a surface roughness of Ra≤1.6 m;

step two: installation of the wound stator core: pressing the wound stator core into the placement cavity, ensuring a clearance fit between the outer diameter of the wound stator core and the inner wall of the placement cavity, with a fit clearance of 0.15 mm±0.05 mm;

step three: installation of the PCB: fixing the PCB to the bottom of the placement cavity by means of screws, and using silicone tubing to protect wires connecting the wound stator core and the PCB, wherein an excess length of 5 mm is set for the wires;

step four: installation of an assembly of the rotor and the blades: fixedly connecting the rotor and the blades, and then installing same into the rotor cavity, ensuring that the rotor rotates smoothly without blocking and that an axial play is equal to or less than 0.5 mm;

step five: sealing of the placement cavity: bonding a cover plate made of an ABS material to the top of the placement cavity by means of a waterproof adhesive, and after the adhesive is applied, applying a pressure of 5 N and maintaining the pressure for 24 hours to allow curing, wherein a sealing layer after curing is capable of withstanding a water pressure of 0.2 MPa without leakage;

step six: installation of the solar panel: bonding the solar panel to the upper surface of the housing by means of an adhesive film, and removing air bubbles during bonding to ensure an adhesion coverage equal to or greater than 95%;

step seven: application of the protective adhesive layer: using a potting process to apply a transparent protective adhesive layer with a thickness of 2.5 mm±0.2 mm onto the surface of the solar panel, and vulcanizing the transparent protective adhesive layer in an oven at 120° C. for 2 hours to allow curing, wherein the edge of the protective adhesive layer extends to the upper surface of the cover plate; and step eight: installation of the filter screen and the float ring: snap fitting the filter screen beneath the pump casing, and bonding the float ring to the lower surface of the housing by means of hot-melt adhesive, wherein the lower surface of the float ring is flush with the lower surface of the housing.

Furthermore, in step three, the wound stator core employs Φ0.6 mm high-strength enameled copper wire, which is divided into three groups connected in a star configuration, with each group having 100 turns and a DC resistance of 4 Ω±0.2Ω, and the three-phase windings are spatially spaced at an electrical angle of 120° to each other.

Furthermore, in step four, the rotor employs an N35 grade neodymium iron boron permanent magnet, which is encapsulated in POM plastic by means of injection molding, and the surface of the rotor is plated with a triple-layer nickel-copper-nickel coating with a total thickness of 8 m; and four blades, made of POM plastic, are arranged at a backward sweep angle of 35°, and the edges of the blades are filleted with a radius of 0.8 mm.

Furthermore, in step seven, the transparent protective adhesive layer is made of food-grade silicone rubber and is formed by vulcanization at 120° C. for 2 hours; and the transparent protective adhesive layer has a light transmittance of over 92% and a waterproof rating of IP68.

Compared with the prior art, the present disclosure has the following beneficial effects:

Integrated design: The housing, the placement cavity, the rotor cavity, the flow channel and other structures are integrally injection-molded, reducing seams between components and enhancing the overall waterproof performance. This also eliminates a step-by-step assembly process, reducing labor and material costs.

Efficient water flow drive: The side water channel of the pump casing and the flow channel are designed at a certain inclined angle, reducing water flow resistance and improving flow efficiency. The removable filter screen prevents impurities from entering the pump casing, extending the service life of the device.

The manufacturing and assembly method are scientific and reasonable, ensuring product consistency and reliability, while improving manufacturing efficiency and reducing production costs.

The present disclosure adopts an integrated form for assembly and installation, thereby reducing the separate production, assembly, and installation of individual water pumps, controllers, and solar panels, effectively enhancing the overall product performance and saving materials and labor.

BRIEF DESCRIPTION OF DRAWINGS

To provide a clear explanation of the technical solutions in the embodiments of the present disclosure, the accompanying drawings used in the description of the embodiments will be briefly introduced below. Obviously, the accompanying drawings in the following description are merely some embodiments of the present disclosure. For those skilled in the art, other drawings may also be obtained from these accompanying drawings without creative effort.

DESCRIPTION OF REFERENCE SIGNS

1—Housing; 11—Float ring; 12—Placement cavity; 13—Rotor cavity; 14—Flow channel; 141—Water outlet; 15—Rotary shaft; 2—Solar panel; 3—Cover plate; 4—PCB; 5—Wound stator core; 6—Rotor; 7—Blade; 8—Pump casing; 9—Filter screen.

DETAILED DESCRIPTION OF THE EMBODIMENTS

The technical solutions in the embodiments of the present disclosure will be clearly and completely described below in conjunction with the drawings in the embodiments of the present disclosure. Obviously, the described embodiments are only some of the embodiments of the present disclosure, but not all of the embodiments. Based on the embodiments of the present disclosure, all other embodiments obtained by those skilled in the art without any creative effort shall fall within the scope of protection of the present disclosure.

Referring to FIGS. 1 to 8, an integrated solar fountain according to the present disclosure aims to address the inherent shortcomings of existing split-type solar fountains in terms of waterproofness, assembly efficiency and operational stability by means of a highly integrated structural design.

Figure 1:
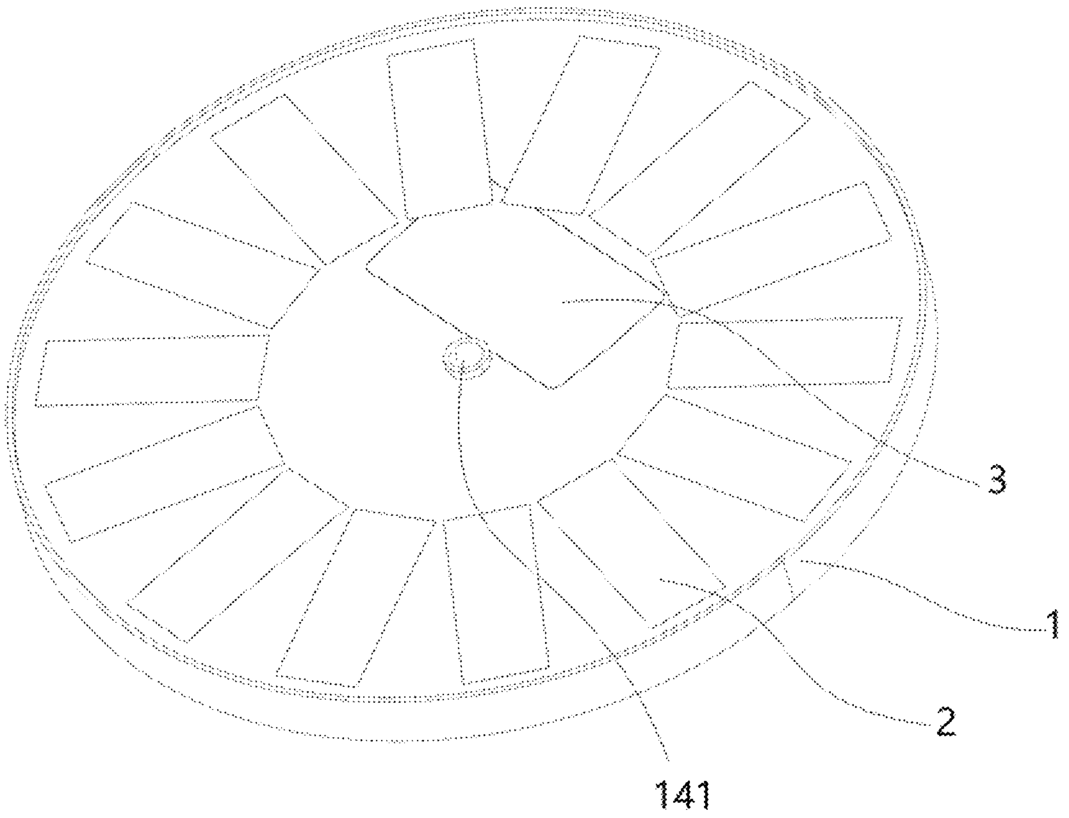
FIGS. 1 and 2 are overall schematic diagrams provided according to embodiments of the present disclosure.
Figure 2:
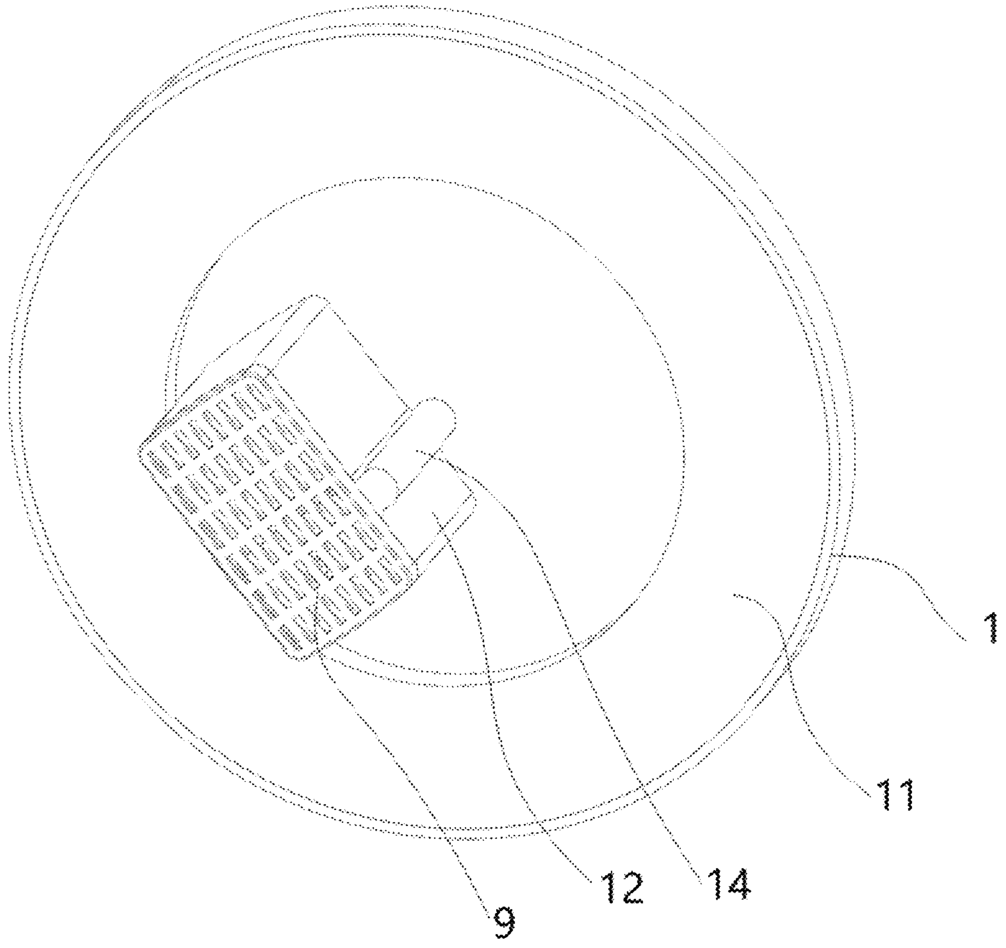
Figure 3:
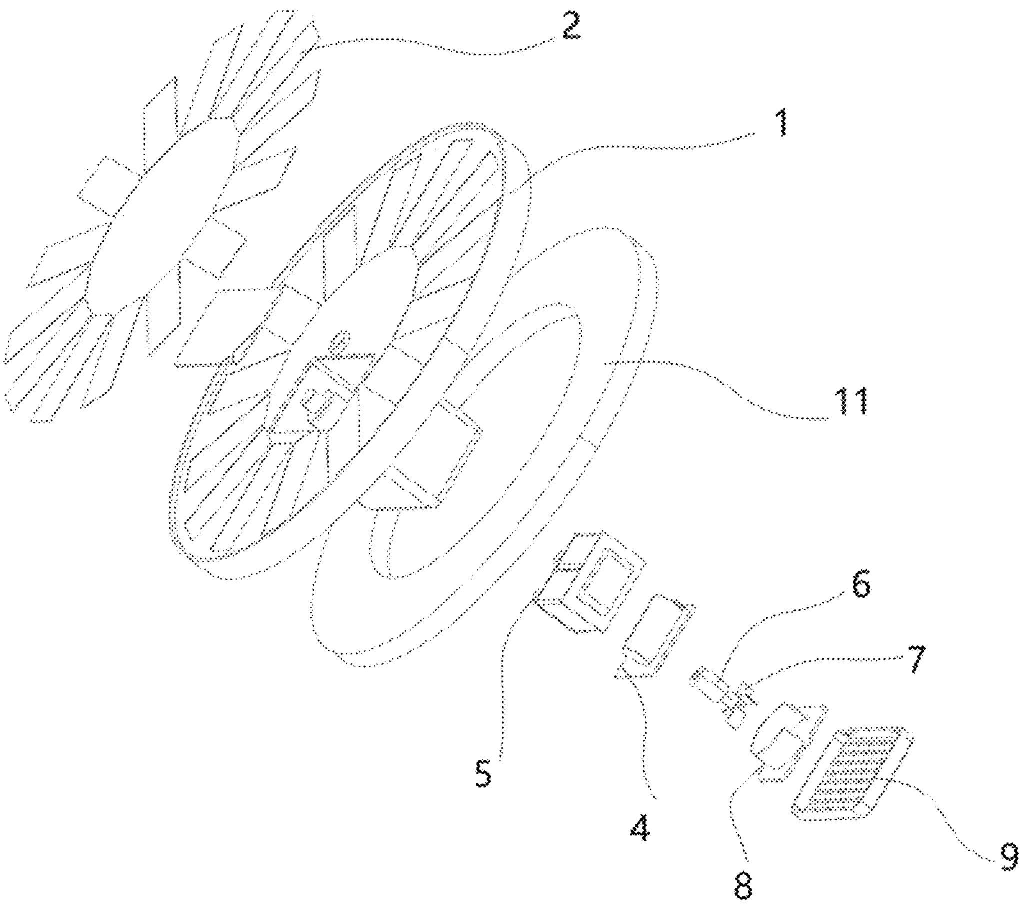
FIGS. 3 and 4 are explosion diagrams provided according to embodiments of the present disclosure.
Figure 4:
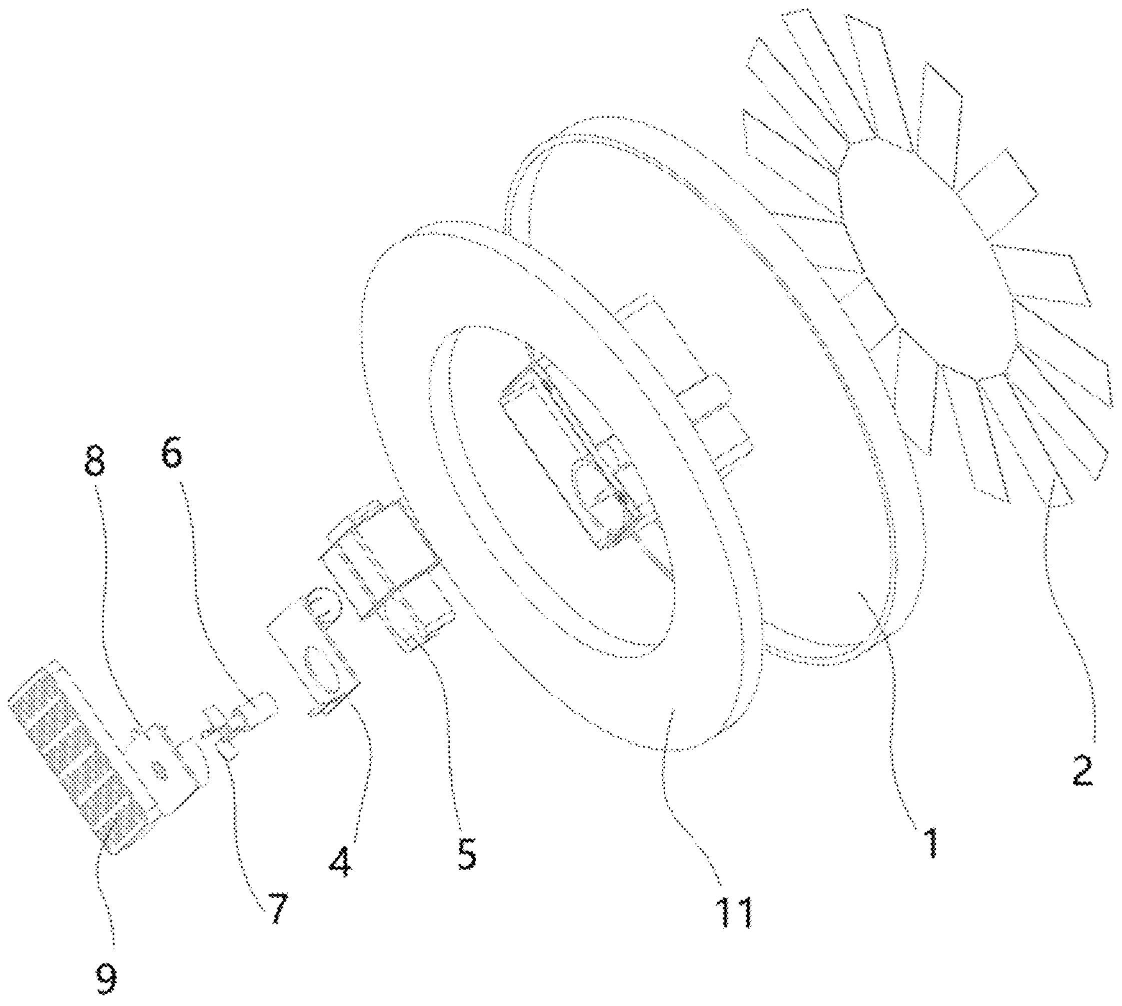
Figure 5:
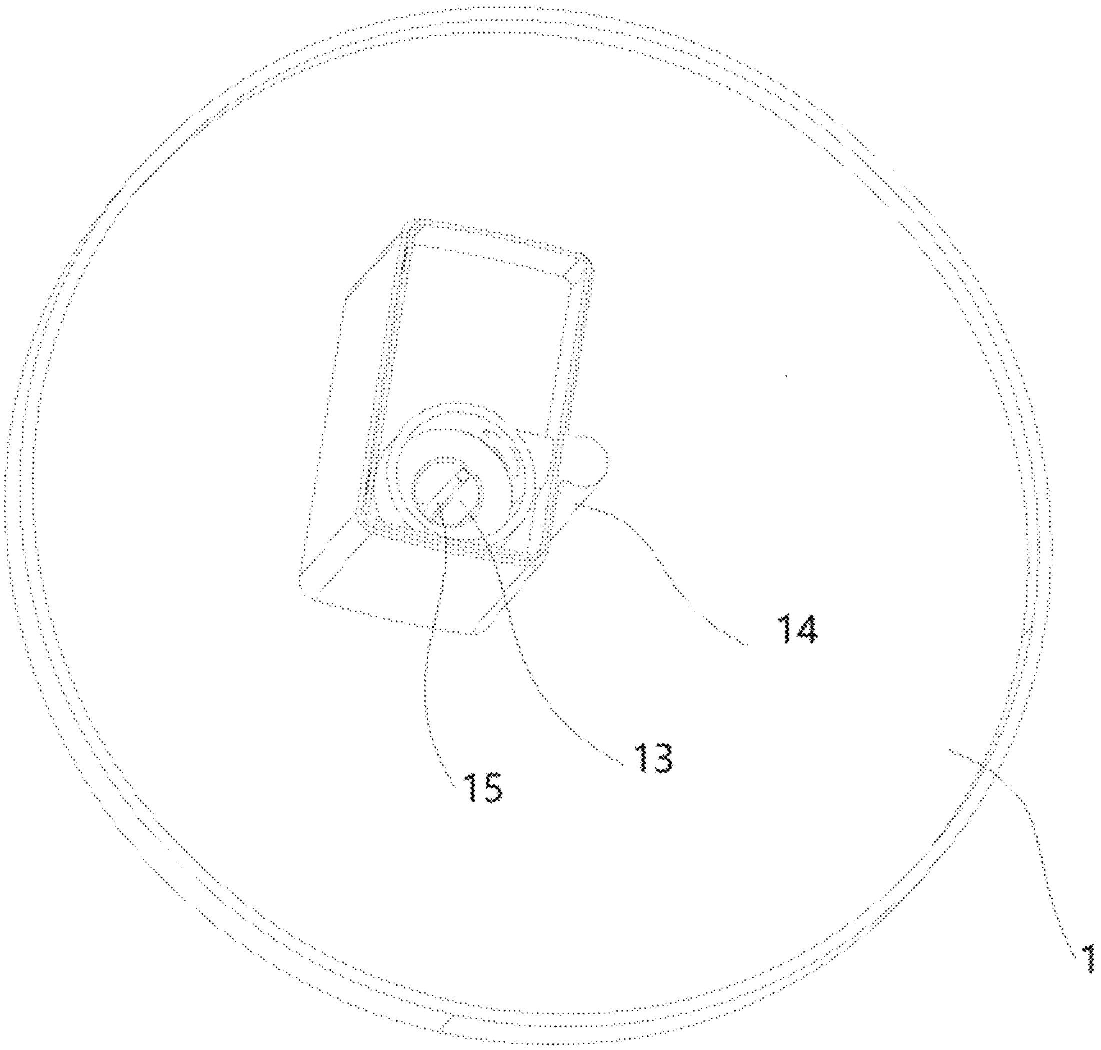
FIGS. 5 and 6 are schematic diagrams of a housing structure provided according to embodiments of the present disclosure.
Figure 6:
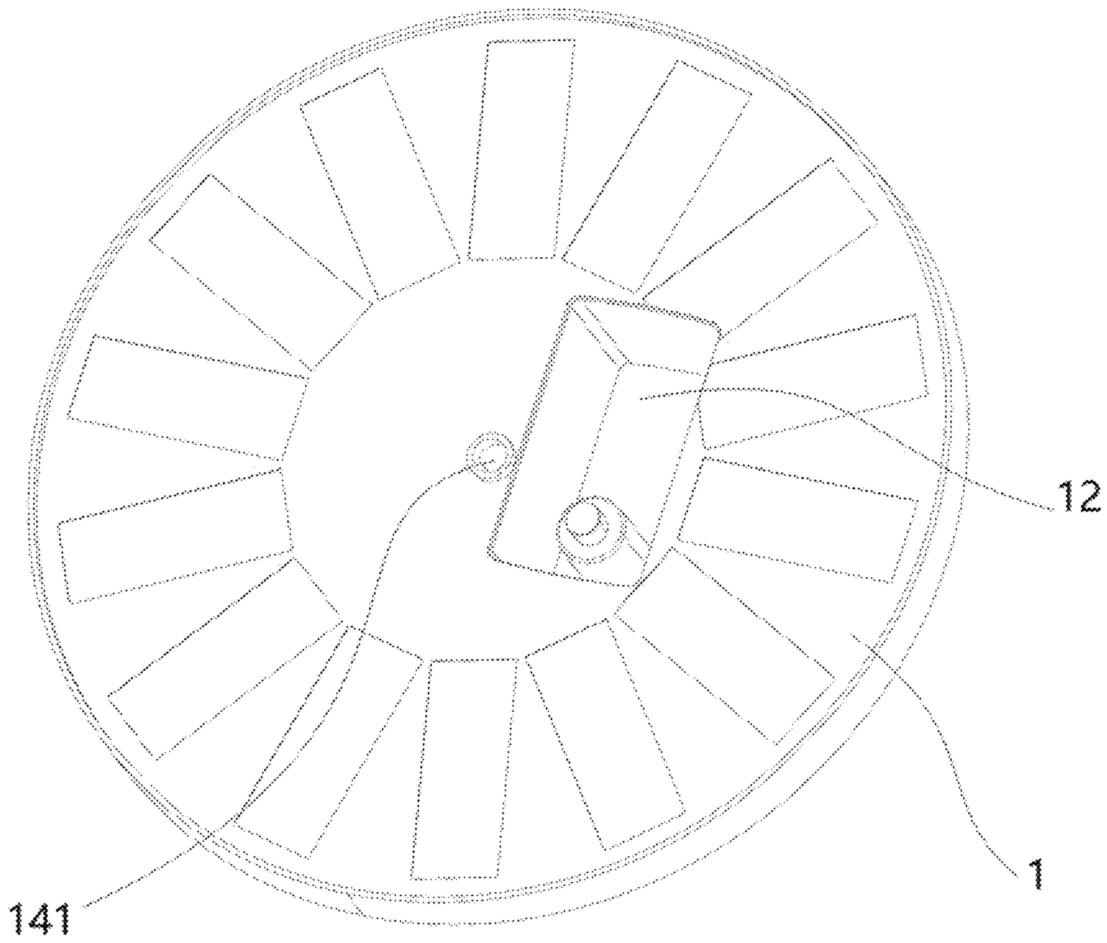
Figure 7:
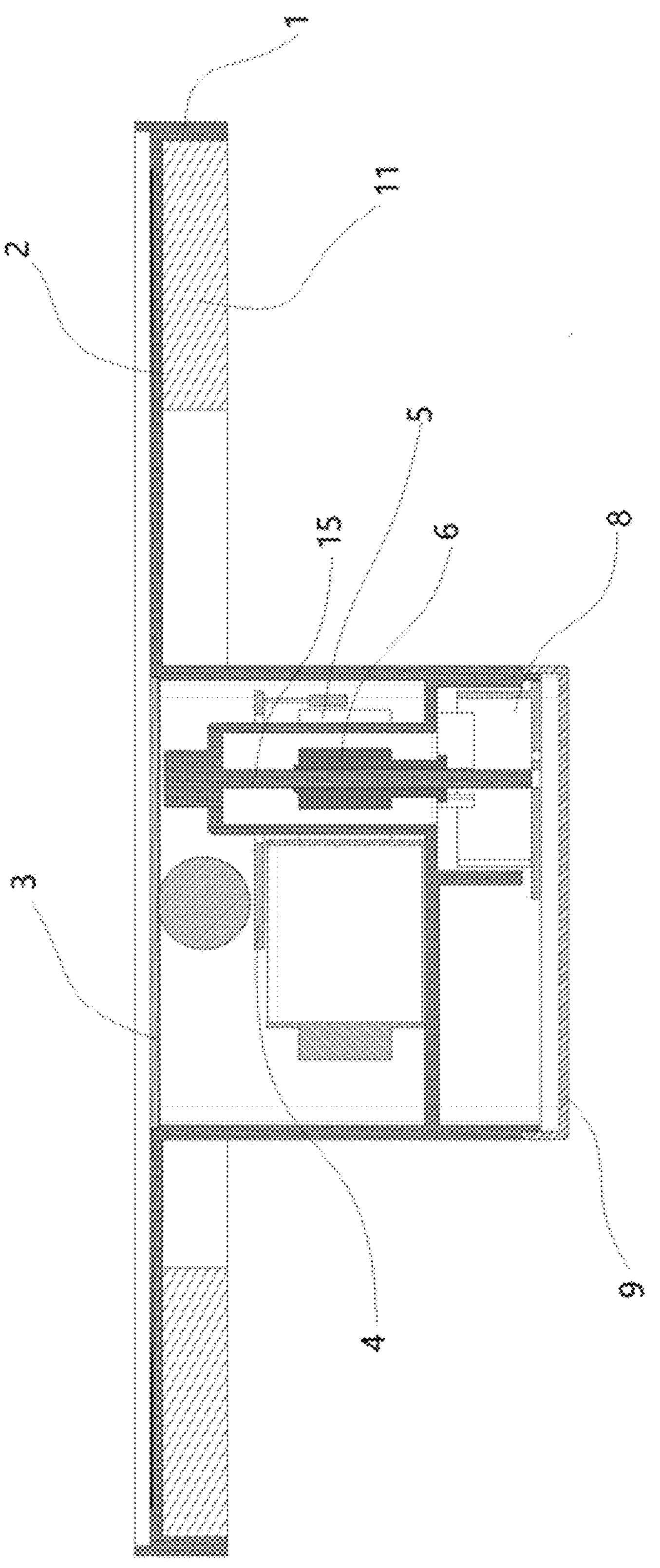
FIG. 7 is a cross-sectional schematic diagram provided according to an embodiment of the present disclosure.

As shown in FIGS. 5 and 6, a housing 1, which serves as the primary load-bearing component of an entire device, is integrally molded from ABS engineering plastic using a precision injection molding process. This material is selected for its excellent overall performance. The housing 1 is disk-shaped as a whole. The integrated structure of the housing 1 is the basis for achieving the integrated design. The housing integrates three functional zones, i.e., a placement cavity 12, a rotor cavity 13, and a flow channel 14. The three functional zones are formed in a single molded piece by means of injection molding, eliminating seams from component assembly in a split-type structure.

The placement cavity 12 is located at a lower portion of the housing 1 and protrudes downward. The rotor cavity 13 is coaxially arranged at the center of the placement cavity 12. The inner wall of the rotor cavity is precision-ground to ensure the concentricity of a rotor 6 during rotation. The flow channel 14 may employ a spiral ascending structure, starting from the side surface of the pump casing 8 and ending at a water outlet 141 at the top of the housing 1. The flow channel 14 may have a conical shape with a narrow upper end and a wide lower end.

The solar panel 2, which serves as an energy input unit, employs a monocrystalline silicon panel with dimensions matching the upper surface of the housing 1. The effective power generation area of the solar panel 2 accounts for 90% of the upper surface area of the housing 1. The solar panel 2 is connected to the upper surface of the housing 1 using a film bonding process to ensure that it will not detach under long-term water flow impact and temperature variations. The surface of the solar panel 2 is covered with a transparent silicone protective adhesive layer having a light transmittance of over 92%, ensuring that the light absorption efficiency of the solar panel 2 remains unaffected. In addition, the protective adhesive layer has excellent weather resistance and can block moisture intrusion. The edge of the protective adhesive layer extends to the upper surface of a cover plate 3, further enhancing waterproofing for the placement cavity 12.

The core of a circuit control module is a PCB (Printed Circuit Board) 4, which integrates multiple crucial components. The PCB 4 is mounted at a distance of 6 mm±0.2 mm from the outer circumference of the rotor 6, enabling precise detection of magnetic field variations during the rotation of the rotor 6. The frequency of an output pulse signal from the PCB 4 is linearly proportional to the speed of the rotor 6, providing precise timing control for motor commutation.

This embodiment provides two optional solutions for an energy storage element. When a 2.7V/10 F supercapacitor is employed, it can maintain device operation for approximately 4 minutes after light interruption, making it suitable for short-term cloudy conditions. Alternatively, when a 3.7V/2000 mAh lithium polymer battery is selected, it can maintain device operation for up to 10 hours in complete darkness when fully charged, meeting the requirements for nighttime or overcast conditions. In both solutions, the energy storage elements are connected to a copper foil on the PCB 4 by means of nickel strip soldering, with the soldered areas coated with insulating paint to prevent short circuits. A drive circuit employs a BTN7971 chip in a TO-263 package, which, in conjunction with external N-channel MOSFETs, forms an H-bridge drive structure. This enables flexible control over the current direction in the wound stator core 5, ensuring stable rotation of the rotor 6. A protection circuit includes overcharge protection, over-discharge protection, and short-circuit protection. When an abnormal state is detected, the protection circuit can cut off a main circuit within 100 ms to prevent component damage.

The outer diameter of the wound stator core 5 is in clearance fit with the inner wall of the placement cavity 12. The winding employs Φ0.6 mm high-strength enameled copper wire, which is divided into three groups connected in a star configuration, with each group having 100 turns and a DC resistance of 4 Ω±0.2Ω. The three-phase windings are spatially spaced at an electrical angle of 120° to each other. When a symmetrical alternating current is applied, the three-phase windings can generate a rotating magnetic field with a magnetic flux density ranging from 0.8 T to 1.0 T, providing a stable driving torque for the rotor 6.

A power transmission system consists of the rotor 6, blades 7, a rotary shaft 15, and a pump casing 8. The rotor 6 employs a neodymium iron boron permanent magnet, which is encapsulated in POM plastic by means of injection molding to form a cylindrical structure.

The injection molding material of the pump casing 8 is modified PP. A side water channel is connected to the flow channel 14 at an angle of 45°, which improves the water flow efficiency. A water inlet of the pump casing 8 is located directly above a filter screen 9 to ensure a stable water flow when water enters and avoid cavitation caused by vortexes.

Afloat ring 11, which is made of an EVA foam material, is connected to an annular recess on the lower surface of the housing 1 by means of hot-melt adhesive. The lower surface of the float ring 11 is flush with the lower surface of the housing 1, ensuring that the device remains level on the water surface and minimizing uneven water flow caused by tilting.

The filter screen 9 is snap-fitted with the pump casing 8, allowing users to clean the filter screen 9 regularly to avoid clogging by impurities.

A manufacturing and assembly method according to the present disclosure is carried out according to the following steps to ensure product performance.

In step one, pre-treatment is performed on the housing 1. The integrated injection-molded housing 1 is deburred, and especially the interior of the flow channel 14 needs to be polished with a dedicated tool to ensure a surface roughness of Ra≤1.6 m.

In step two, the wound stator core 5 is installed. The wound stator core 5 is pressed into the placement cavity 12, ensuring a clearance fit between the outer diameter of the wound stator core 5 and the inner wall of the placement cavity 12, with a fit clearance of 0.15 mm±0.05 mm. The wound stator core 5 employs Φ0.6 mm high-strength enameled copper wire, which is divided into three groups connected in a star configuration, with each group having 100 turns and a DC resistance of 4 Ω±0.2Ω. The three-phase windings are spatially spaced at an electrical angle of 120° to each other.

In step three, the PCB 4 is installed. The PCB 4 is fixed to the bottom of the placement cavity 12 by means of screws. Wires connecting the wound stator core 5 and the PCB 4 need to be protected with silicone tubing, and an excess length of 5 mm is set for the wires to prevent breakage due to pulling.

In step four, an assembly of the rotor 6 and the blades 7 is installed. The rotor 6 and the blades 7 are fixedly connected and then installed into the rotor cavity 13, ensuring that the rotor 6 rotates smoothly without jamming and that an axial play is equal to or less than 0.5 mm. The rotor 6 employs an N35-grade neodymium iron boron permanent magnet, which is encapsulated in POM plastic by means of injection molding. The surface of the rotor 6 is plated with a triple-layer Ni—Cu—Ni (nickel-copper-nickel) coating with a total thickness of 8 m. Four blades 7, made of POM plastic, are arranged at a backward sweep angle of 35°, and the edges of the blades 7 are filleted with a radius of 0.8 mm.

In step five, the placement cavity 12 is sealed. The cover plate 3, made of an ABS material, is bonded to the top of the placement cavity 12 by means of a waterproof adhesive. The adhesive is silicone sealant. After the adhesive is applied, a pressure of 5N is applied and maintained for 24 hours to allow curing. The sealing layer formed after curing can withstand a water pressure of 0.2 MPa without leakage.

In step six, the solar panel 2 is installed. The solar panel 2 is bonded to the upper surface of the housing 1 by means of an adhesive film. Air bubbles are removed during bonding to ensure an adhesion coverage equal to or greater than 95%.

In step seven, the protective adhesive layer is applied. A transparent protective adhesive layer with a thickness of 2.5 mm±0.2 m is applied onto the surface of the solar panel 2 using a potting process, and is vulcanized in an oven at 120° C. for 2 hours to allow curing. The transparent protective adhesive layer is made of food-grade silicone rubber with a light transmittance of over 92% and a waterproof rating of IP68. The edge of the protective adhesive layer extends to the upper surface of the cover plate 3 to further enhance the waterproof effect.

In step eight, the filter screen 9 and the float ring 11 are installed. The filter screen 9 is snap-fitted beneath the pump casing 8. The float ring 11 is bonded to the lower surface of the housing 1 by means of hot-melt adhesive, the lower surface of the float ring 11 being flush with the lower surface of the housing 1. The overall assembly is completed.

Figure 8:
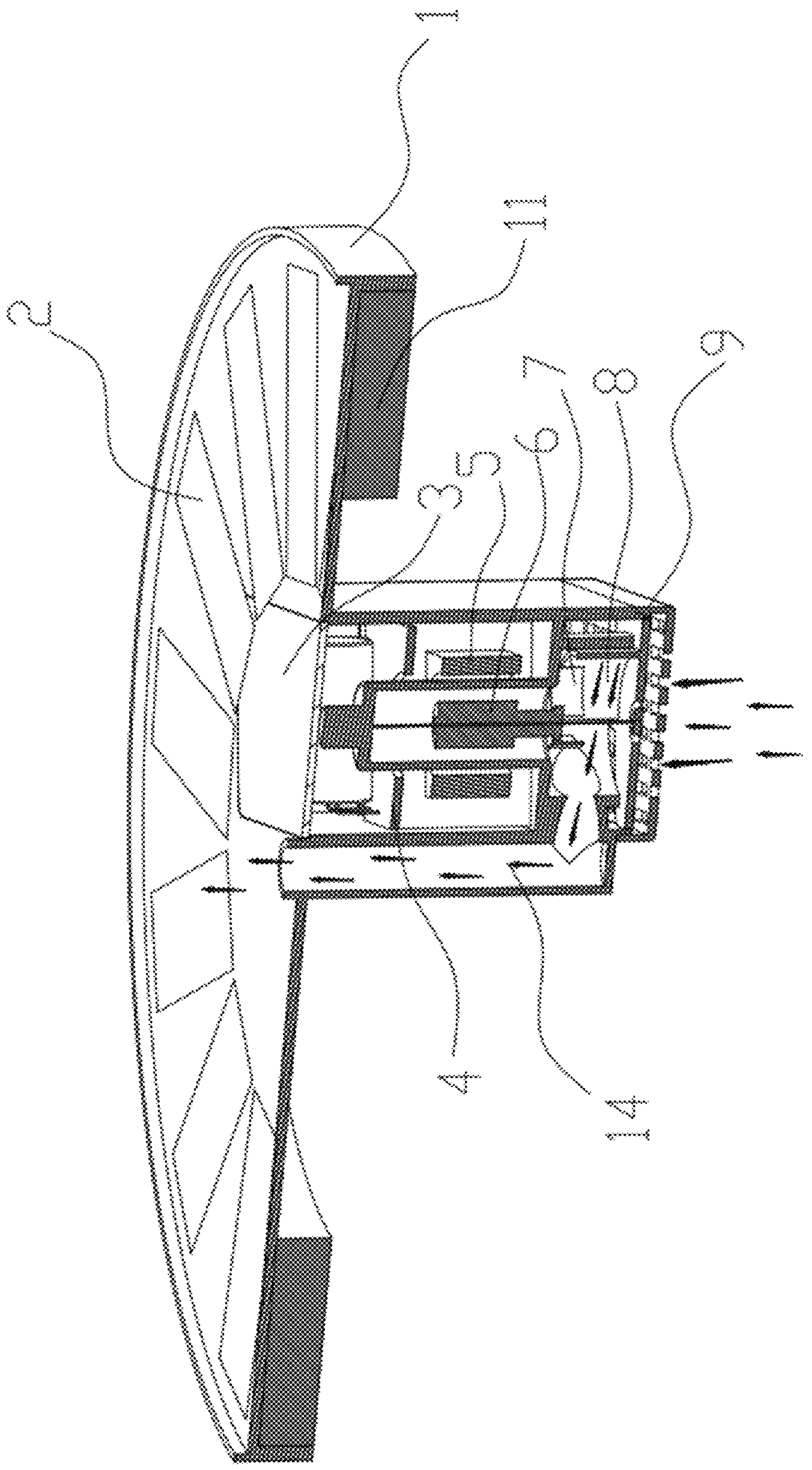
FIG. 8 is a cross-sectional view illustrating a working principle provided according to an embodiment of the present disclosure.

As shown in FIG. 8, the working process of the present disclosure is as follows. Under sunlight conditions, the solar panel 2 absorbs light energy and converts it into electrical energy. A portion of the electrical energy directly drives the wound stator core 5 by means of the PCB 4 to generate a rotating magnetic field, while the remaining electrical energy can be stored in the energy storage element. A Hall element detects the position of the rotor 6 in real time and transmits a signal to the control circuit on the PCB 4. The control circuit promptly switches the direction of the current in the wound stator core 5 on the basis of the position of the rotor 6, such that the rotating magnetic field continuously drives the rotor 6 to rotate. The rotor 6 drives the blades 7 to rotate at high speed inside the pump casing 8. The centrifugal force generated by the rotation of the blades 7 creates a negative pressure inside the pump casing 8, drawing water through the filter screen 9 into the pump casing 8. The water then enters the flow channel 14 through the side water channel, and is finally ejected from the water outlet 141 to form a fountain. When light is insufficient, the energy storage element releases the stored electrical energy to ensure continuous operation of the device. The filter screen 9 effectively blocks impurities such as sand, gravel, and aquatic plants in the water, preventing them from entering the pump casing 8 and causing wear on the blades 7 or clogging the flow channel 14. The float ring 11 provides stable buoyancy, keeping the device balanced on the water surface and reducing displacement caused by water flow impact.

Those skilled in the art, after considering the description and practicing the present disclosure, will readily conceive of other embodiments of the present disclosure. The present disclosure is intended to cover any variations, uses or adaptive modifications of the present disclosure, which follow the general principles of the present disclosure and include common knowledge or conventional technical means in the art not disclosed in the present disclosure. The description and examples are to be considered as exemplary only, with the true scope and gist of the present disclosure being indicated by the appended claims.

It will be appreciated that the present disclosure is not limited to the precise constructions described above and illustrated in the accompanying drawings, and that various modifications and changes may be made without departing from the scope thereof. The scope of the present disclosure is defined only by the appended claims.

What is claimed is:

1. An integrated solar fountain, comprising:

a housing, a solar panel, a printed circuit board (PCB), a wound stator core, a rotor, and blades, wherein the housing is an integrated injection-molded structure, which forms a placement cavity, a rotor cavity, and a flow channel inside the housing;

the solar panel is fixed to the upper surface of the housing;

the PCB and the wound stator core are mounted in the placement cavity in a sealing manner, and the wound stator core surrounds the rotor cavity; the rotor cavity is provided with a fixedly mounted rotary shaft, and the rotor is mounted to the rotary shaft;

a pump casing is fixed on an outer side of the bottom of the placement cavity, and the blades are fixed to the rotor and located inside the pump casing; the lower end of the flow channel is in communication with the pump casing, and the upper end of the flow channel extends to the top of the housing to form a water outlet, and the flow channel is further provided with a detachable filter screen disposed beneath the pump casing, the top of the placement cavity is sealed by a cover plate, and an adhesive is filled between the cover plate and the placement cavity to seal the placement cavity and achieve waterproofing.

2. The integrated solar fountain according to claim 1, wherein the housing is circular in shape, and the placement cavity is located at a lower portion of the housing and protrudes downward; a float ring is provided beneath the housing and outside the placement cavity; and the rotor cavity is located in a central area of the placement cavity, and the rotor cavity and the placement cavity are coaxially arranged.

3. The integrated solar fountain according to claim 1, wherein the surface of the solar panel is covered with a transparent protective adhesive layer, which simultaneously covers the cover plate to seal electronic components inside the placement cavity.

4. The integrated solar fountain according to claim 1, wherein the PCB integrates a Hall element and an energy storage element, wherein the energy storage element is a supercapacitor or a rechargeable battery.

5. The integrated solar fountain according to claim 1, wherein a water inlet of the pump casing is located directly above the filter screen, and a water outlet of the pump casing is in communication with the lower end of the flow channel through a side water channel.

6. A method for manufacturing and assembling the integrated solar fountain according to claim 1, the method comprising following steps:

step one: housing pre-treatment: deburring the integrated injection-molded housing and polishing the interior of the flow channel;

step two: installation of the wound stator core: pressing the wound stator core into the placement cavity, ensuring a clearance fit between the outer diameter of the wound stator core and the inner wall of the placement cavity, with a fit clearance of 0.15 mm±0.05 mm;

step three: installation of the PCB: fixing the PCB above the wound stator core by means of screws, and using silicone tubing to protect wires connecting the wound stator core and the PCB;

step four: installation of an assembly of the rotor and the blades: fixedly connecting the rotor and the blades, and then installing same into the rotor cavity, ensuring that the rotor rotates smoothly without blocking and that an axial play is equal to or less than 0.5 mm;

step five: sealing of the placement cavity: bonding the cover plate made of an ABS material to the top of the placement cavity by means of a waterproof adhesive, and after the adhesive is applied, applying a pressure of 5 N and maintaining the pressure for 24 hours to allow curing;

step six: installation of the solar panel: bonding the solar panel to the upper surface of the housing by means of an adhesive film, and removing air bubbles during bonding;

step seven: application of the protective adhesive layer: using a potting process to apply a transparent protective adhesive layer with a thickness of 2.5 mm±0.2 mm onto the surface of the solar panel, and vulcanizing the transparent protective adhesive layer in an oven at 120° C. for 2 hours to allow curing; and step eight: installation of the filter screen and the float ring: snap fitting the filter screen beneath the pump casing, and bonding the float ring to the lower surface of the housing by means of hot-melt adhesive, wherein the lower surface of the float ring is flush with the lower surface of the housing.

7. The method for manufacturing and assembling the integrated solar fountain according to claim 6, wherein in step three, the wound stator core employs Φ0.6 mm high-strength enameled copper wire, which is divided into three groups connected in a star configuration, with each group having 100 turns and a DC resistance of 4Ω±0.2Ω, and the three-phase windings are spatially spaced at an electrical angle of 120° to each other.

8. The method for manufacturing and assembling the integrated solar fountain according to claim 6, wherein in step four, the rotor employs an N35 grade neodymium iron boron permanent magnet, which is encapsulated in POM plastic by means of injection molding, and the surface of the rotor is plated with a triple-layer nickel-copper-nickel coating with a total thickness of 8 μm; and four blades, made of POM plastic, are arranged at a backward sweep angle of 35°, and the edges of the blades are filleted with a radius of 0.8 mm.

9. The method for manufacturing and assembling the integrated solar fountain according to claim 6, wherein in step seven, the transparent protective adhesive layer is made of food-grade silicone rubber and is formed by vulcanizing at 120° C. for 2 hours.

* * * * *